L. G. WILSON.
BEET HARVESTER.
APPLICATION FILED MAR. 3, 1915.
1,257,168.
Patented Feb. 19, 1918.
3 SHEETS—SHEET 1.
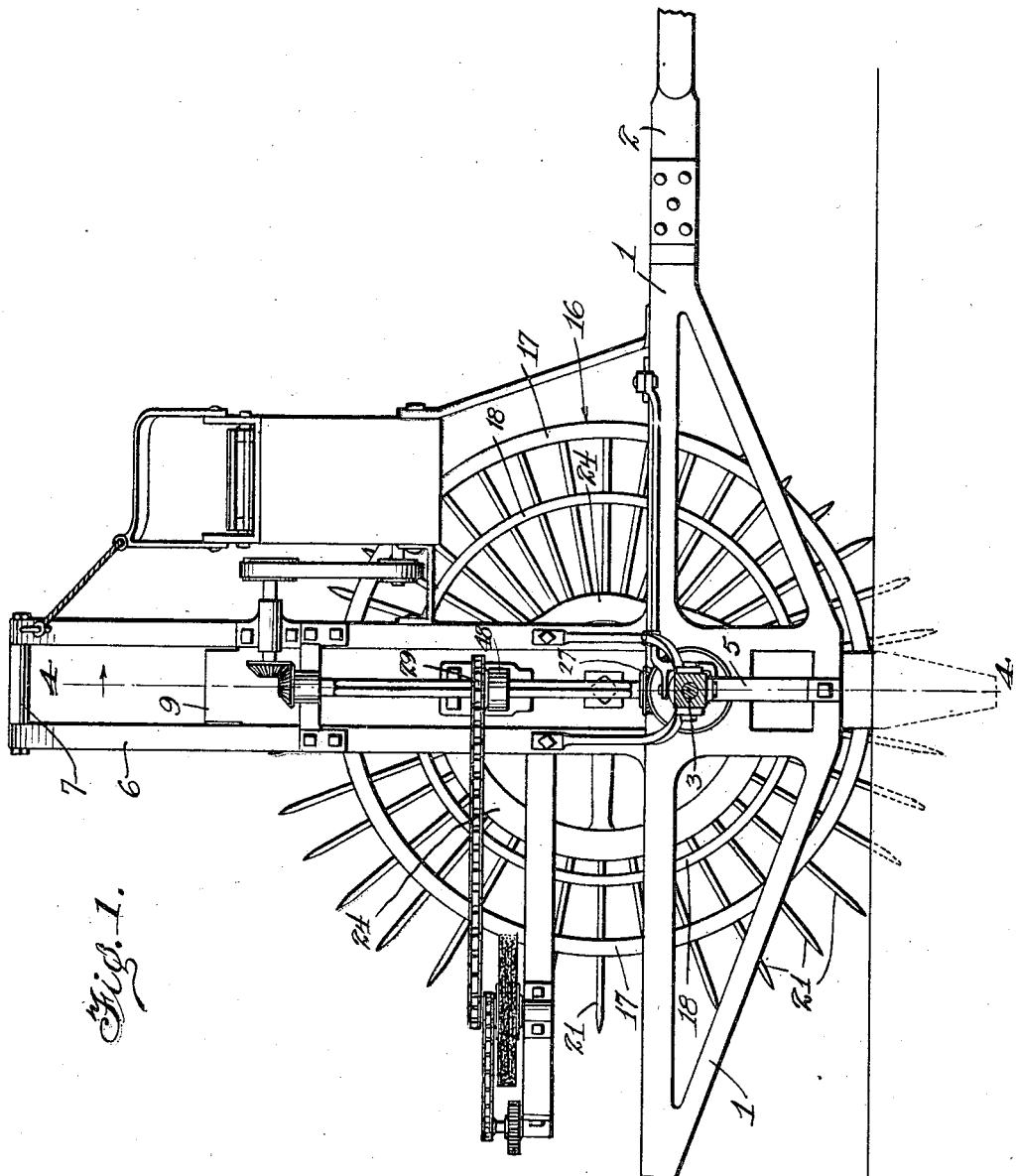
Witnesses
W. C. Mulligan
W. Evatt Jr.
Inventor
Louie Glenn Wilson
By Richard B. Owen,
Attorney

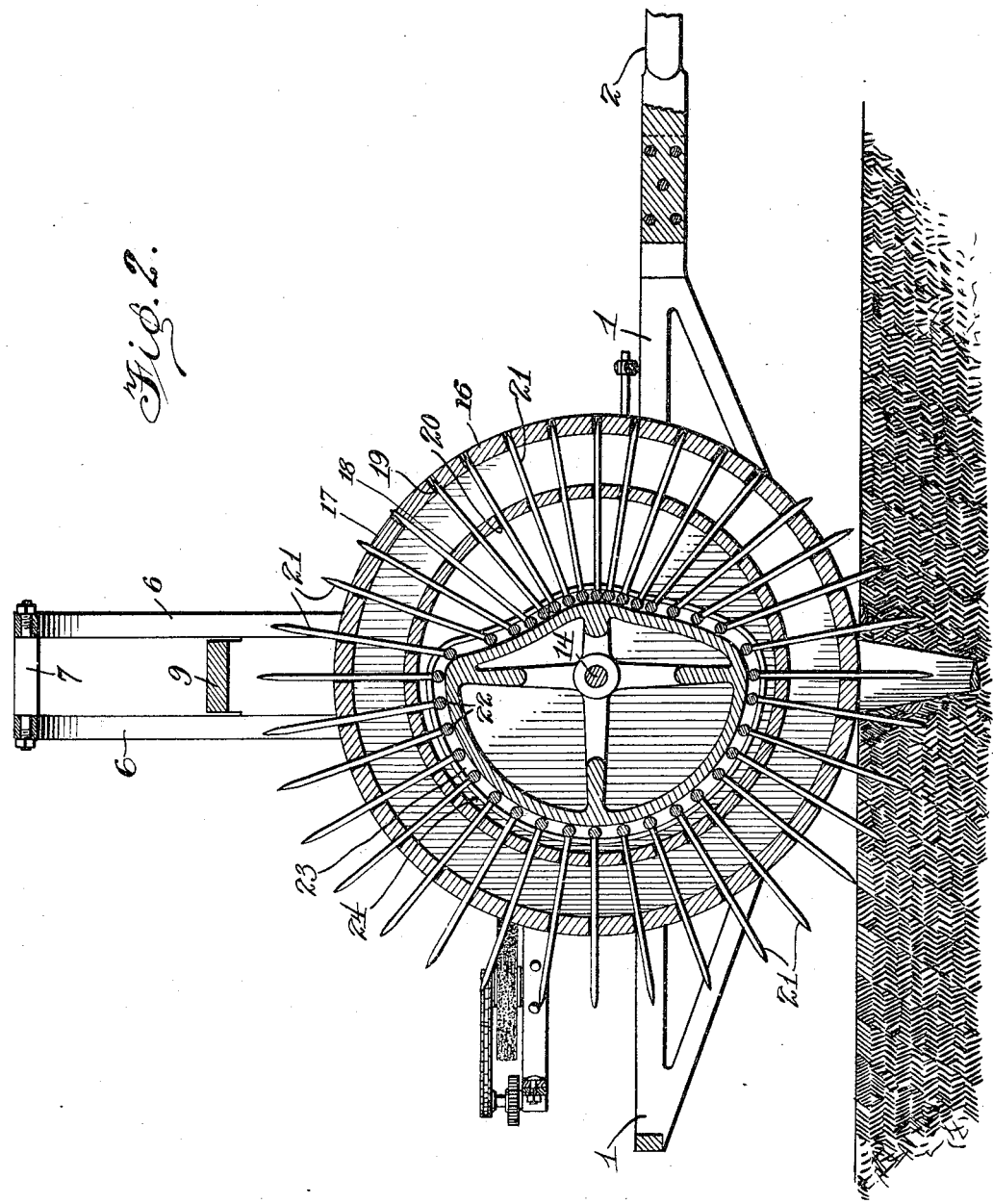

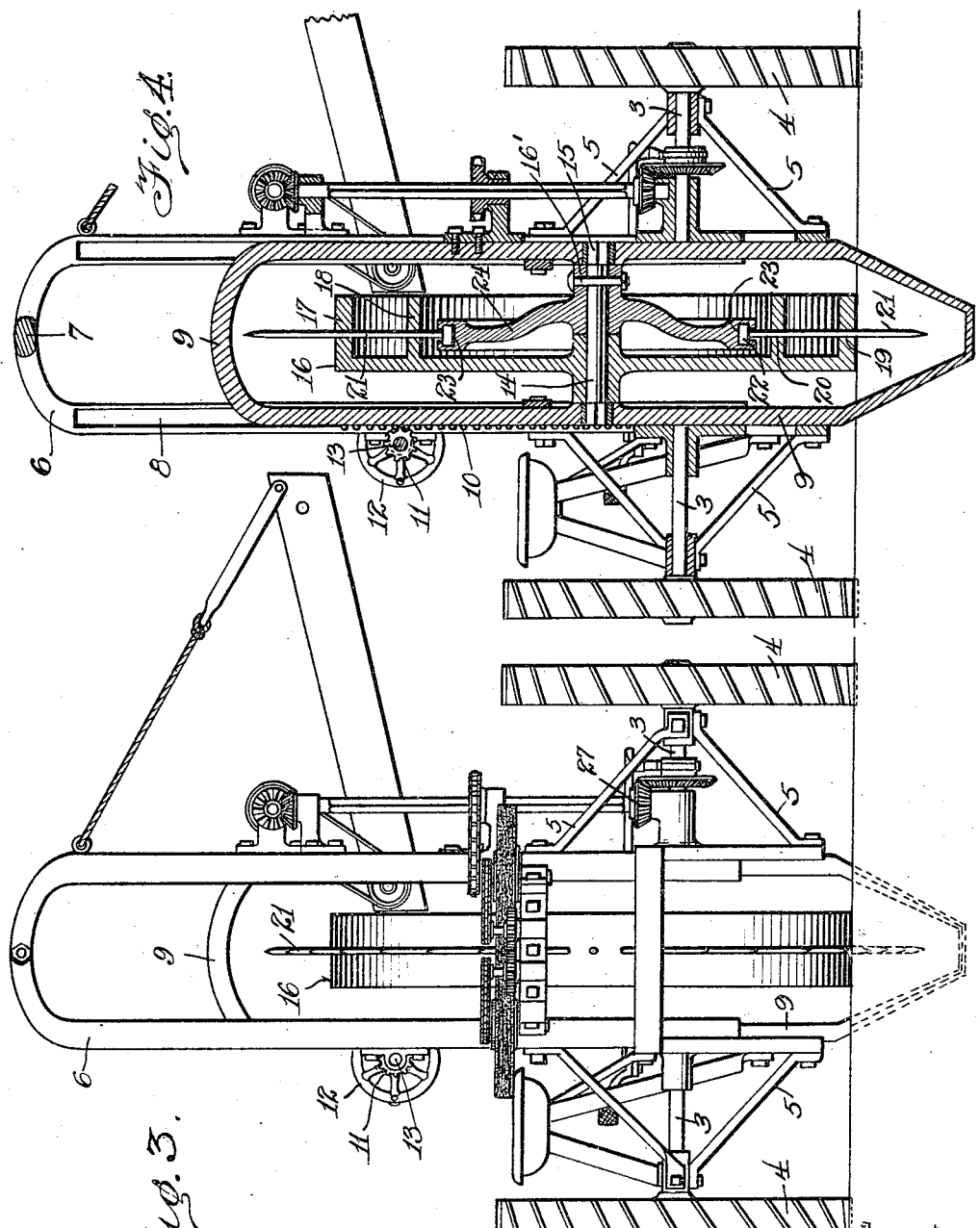

UNITED STATES PATENT OFFICE.

LOUIE GLENN WILSON, OF MORNING SUN, IOWA.

BEET-HARVESTER.

1,257,168.　　　　　　Specification of Letters Patent.　　Patented Feb. 19, 1918.

Application filed March 3, 1915. Serial No. 11,793.

*To all whom it may concern:*

Be it known that I, LOUIE GLENN WILSON, citizen of the United States, residing at Morning Sun, in the county of Louisa and State of Iowa, have invented certain new and useful Improvements in Beet-Harvesters, of which the following is a specification.

My invention relates to beet harvesters.

An object of the invention is to provide a machine in which a rotating wheel, equipped with reciprocable radial teeth, is utilized to penetrate, grasp and extract the beets from the soil.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a view of my beet harvester in side elevation, partly in section,

Fig. 2, is a view thereof in vertical longitudinal section,

Fig. 3, is a view of the machine in rear end elevation, and

Fig. 4, is a central transverse vertical section.

Referring now to the drawings by numerals, 1 designates as an entirety the main frame of the machine, said frame having connection at its forward end with the draft tongue 2, and providing, as is old in the art, a bearing or support for two axially alined axle sections 3, each section mounting a traction wheel 4, through rotation of which the power necessary to the operation of certain of the sub-mechanisms comprising a part of the invention is obtained. Each axle section is braced as indicated at 5.

Main frame 1 is equipped with a vertical frame structure 6, said structure comprising parallel uprights spaced as shown, said sections being joined and braced as indicated at 7, the sections being provided with longitudinal guide grooves 8, the said grooves affording a guide means whereby vertical movement of an adjustable frame structure 9 may be directed.

Structure 9 affords a support and bearing for a shaft 14, said shaft being held against rotation by constructing its respective terminals in the manner shown as indicated at 15 and to advantage as indicated in Fig. 4.

Said shaft 14 carries a novel type of wheel 16, the wheel being rotatable on the shaft and adapted, when the machine is in use, for contact with the ground or soil. Spaced annular flanges 17 and 18 extend laterally of the wheel 16, the respective flanges being provided with alined radial openings 19 and 20 which afford a means whereby the teeth 21 may be directed and guided in their reciprocable movement obtained in a manner to subsequently appear. The teeth 21 extend radially with respect to the axis of rotation of wheel 16, each tooth being provided with an enlargement or head portion 22 which, as noted in Fig. 2, is arranged to fit an irregular groove 23 formed in the periphery of an eccentric or cam-wheel structure 24. The wheel 24 is also mounted on the shaft 14, said wheel being of a size to fit the space defined by flange 18, and being held against rotation of said shaft 14 through the medium of a pin 16' which is disposed to penetrate both the hub of the wheel and the shaft.

In operation, the head or enlarged portion 22 of the teeth 21 will operate in the groove 23 aforesaid and, by the eccentric formation of the wheel 24, will cause, as wheel 16 is rotated, the teeth 21 to be reciprocated for a purpose to be later disclosed. The flanges 17 and 18 support the teeth in the desired manner and preclude displacement during movement of said teeth relatively to cam wheel structure 24.

The operation of the extracting mechanism may be briefly stated as follows: The machine or harvester is first placed or arranged to straddle the row of plants. As the machine is advanced, wheel 16 is caused to rotate relatively to cam wheel structure 24. As said machine moves forwardly, it is evident that the teeth 21 will be reciprocated and caused to penetrate the beet roots thereby taking a firm hold on the root to provide for its extraction or removal through continued turning movement of the wheel.

As the wheel 16 is rotated it is evident that the teeth 21 will reciprocate and, as the teeth recede or execute their inward stroke, the beet roots carried thereby will fall by gravity from the periphery of the wheel 16.

Having thus fully described my inven- tion, what I claim as new and desire to secure by Letters Patent, is:—

1. In a beet harvester, a rotatable wheel having an inner and an outer rim, a non-rotatable cam device mounted interiorly of said wheel, radial teeth carried by said cam device for movement bodily about the periphery thereof during rotation of said wheel, the rim structure of said wheel being provided with alined openings to form bearings for said teeth, the said teeth being reciprocable relatively to said wheel, and means to rotate the wheel.

2. In a beet harvesting machine, a rotatable wheel, spaced lateral flanges formed upon said wheel, the flanges having alined openings formed therein, radial teeth mounted to fit the openings thus formed, and a means mounted interiorly of the wheel to engage with and reciprocate the teeth relatively to said flanges, substantially as described.

3. In a beet harvesting machine, a wheel structure provided with spaced annular lateral flanges, a cam structure stationary with respect to said wheel, radial teeth mounted on the cam structure, the several teeth being arranged to fit openings therefor formed in the flanges aforesaid, and means to rotate the wheel and the teeth therewith, said cam structure operating to reciprocate the teeth during a rotation of the wheel for the purpose specified.

4. In a beet harvester, an extracting mechanism, comprising a ground engaging wheel having a pair of concentric circumferentially spaced lateral flanges each having radially alined apertures, means mounting said wheel for rotation, a cam stationary relative to the wheel located within the inner flange, said cam having a concentric portion and an eccentric portion formed on its periphery, said portions having a peripheral groove, a plurality of radial teeth movable in the apertures of the flanges and a lateral cylindrical head on the inner end of each tooth for engagement in the groove of the cam, whereby the teeth may be automatically retracted and extended during rotation of the wheel.

In testimony whereof I affix my signature in presence of two witnesses.

LOUIE GLENN WILSON.

Witnesses:
O. B. McCLURKIN,
A. E. CAMERON.

Copies of this patent may be obtained for five cents each, by addressing the "Commissioner of Patents, Washington, D. C."